(12) United States Patent
Koekemoer et al.

(10) Patent No.: US 7,530,311 B2
(45) Date of Patent: May 12, 2009

(54) BLASTING SYSTEM AND PROGRAMMING OF DETONATORS

(75) Inventors: Andre Louis Koekemoer, Boksburg (ZA); Albertus Abraham Labuschagne, Brakpan (ZA)

(73) Assignee: Detnet South Africa (Pty) Ltd. (ZA)

( * ) Notice: Subject to any disclaimer, the term of this patent is extended or adjusted under 35 U.S.C. 154(b) by 144 days.

(21) Appl. No.: 10/564,624

(22) PCT Filed: Jul. 13, 2004

(86) PCT No.: PCT/ZA2004/000080

§ 371 (c)(1),
(2), (4) Date: Mar. 1, 2007

(87) PCT Pub. No.: WO2005/005915

PCT Pub. Date: Jan. 20, 2005

(65) Prior Publication Data

US 2007/0240598 A1 Oct. 18, 2007

(30) Foreign Application Priority Data

Jul. 15, 2003 (ZA) .................... 2003/5444
Jul. 18, 2003 (ZA) .................... 2003/5561

(51) Int. Cl.
*F23Q 21/00* (2006.01)
*F42D 1/04* (2006.01)
(52) U.S. Cl. ...................... 102/215; 102/217
(58) Field of Classification Search ............... 102/215, 102/217
See application file for complete search history.

(56) References Cited

U.S. PATENT DOCUMENTS

| 4,489,655 A | | 12/1984 | Molnar | |
|---|---|---|---|---|
| 4,846,066 A | | 7/1989 | Beattie et al. | |
| 5,069,129 A | * | 12/1991 | Kunitomo | 102/200 |
| 5,375,524 A | * | 12/1994 | Larson | 102/217 |
| 5,520,114 A | * | 5/1996 | Guimard et al. | 102/215 |
| 6,283,227 B1 | * | 9/2001 | Lerche et al. | 175/4.55 |
| 6,584,907 B2 | * | 7/2003 | Boucher et al. | 102/217 |
| 6,604,584 B2 | * | 8/2003 | Lerche et al. | 175/4.55 |
| 6,629,498 B1 | * | 10/2003 | Marquis | 102/215 |

(Continued)

FOREIGN PATENT DOCUMENTS

| EP | 0 251 824 | 1/1988 |
|---|---|---|
| EP | 0 301 848 | 2/1989 |

OTHER PUBLICATIONS

International Search Report and Written Opinion for PCT/ZA2004/000080, mailed Jan. 5, 2005, 12 pages.

(Continued)

*Primary Examiner*—Bret Hayes
(74) *Attorney, Agent, or Firm*—Cantor Colburn LLP

(57) ABSTRACT

A blasting system which includes a control unit, a communications bus which is connected to the control unit, a plurality of detonators which are connected in sequence to the communications bus along its length, and a daisy chain connection between the control unit and the detonators, and wherein, within the sequence of detonators, a first detonator makes use of the daisy chain connection to enable a second following detonator so that data can be exchanged between the control unit and the second detonator using the communications bus.

14 Claims, 1 Drawing Sheet

U.S. PATENT DOCUMENTS

| | | | |
|---|---|---|---|
| 6,718,881 B2 * | 4/2004 | Rauscher, Jr. | 102/217 |
| 6,889,610 B2 * | 5/2005 | Boucher et al. | 102/217 |
| 6,945,174 B2 * | 9/2005 | Aebi et al. | 102/301 |
| 2003/0101888 A1 * | 6/2003 | Fisher et al. | 102/200 |
| 2003/0159609 A1 * | 8/2003 | Rauscher, Jr. | 102/217 |

OTHER PUBLICATIONS

International Preliminary Examination Report on Patentability for PCT/ZA2004/000080, mailed Oct. 10, 2005, 9 pages.

* cited by examiner

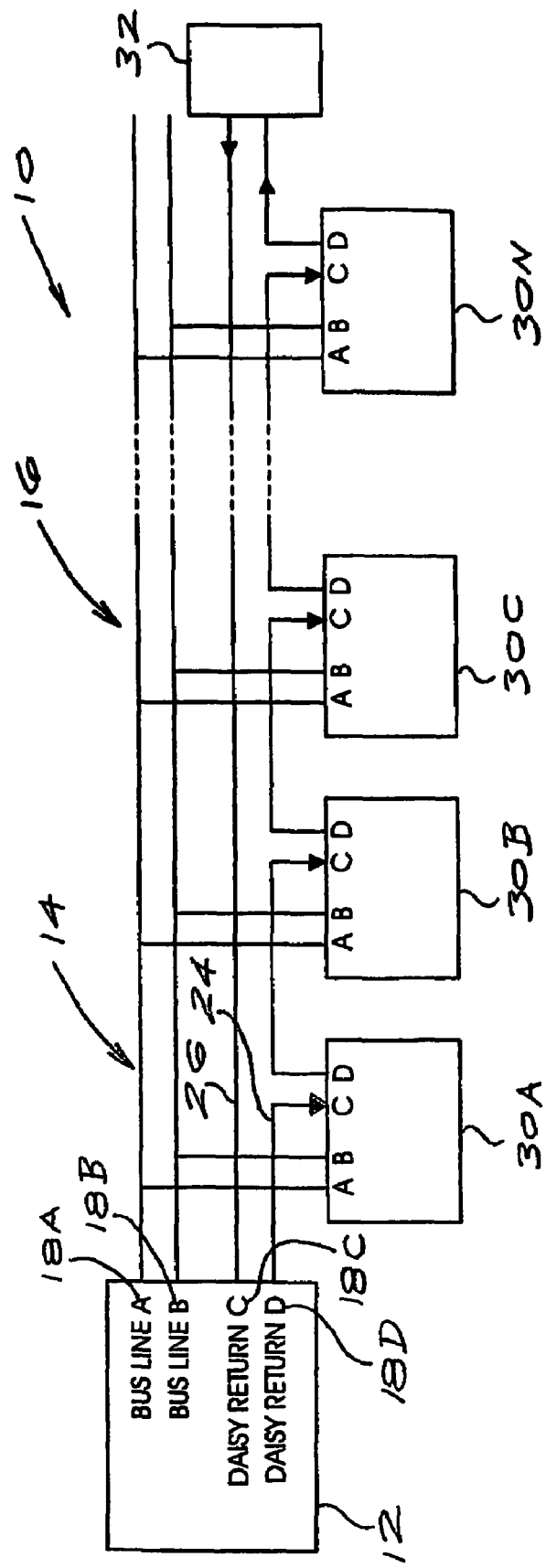

BLASTING SYSTEM AND PROGRAMMING OF DETONATORS

BACKGROUND OF THE INVENTION

This invention relates generally to a blasting system and more particularly is concerned with programming a plurality of electronic delay detonators in a blasting system.

SUMMARY OF INVENTION

The invention provides a method of programming a plurality of detonators which are connected to a control unit by a communications bus, the method including the steps of using the control unit to address a first detonator to allow an exchange of data, on the communications bus, between the first detonator and the control unit and using the first detonator to enable a second detonator to be addressed by the control unit to allow an exchange of data, on the communications bus, between the second detonator and the control unit.

The second detonator may then be used to enable a third detonator to be addressed by the control unit to allow an exchange of data, on the communications bus, between the third detonator and the control unit.

The first detonator may be addressable by the control unit only after a first enabling signal has been sent by the control unit to the first detonator.

The second detonator may be addressable by the control unit only after a second enabling signal has been sent by the first detonator to the second detonator.

The second enabling signal may only be sent once a first disabling signal has been sent by the control unit to the first detonator.

In general terms a detonator (after the first detonator) is addressable by the control unit only after a respective disabling signal has been sent to a preceding detonator by the control unit, and once a respective enabling signal has been sent to the detonator by the preceding detonator.

The aforementioned method can be carried out for each of the detonators.

The detonators are preferably connected to each other using a daisy chain system.

The invention also extends to a method of programming a plurality of detonators in sequence which includes the steps of exchanging data between a first detonator and a control unit using a communications bus to which all of the detonators are connected in parallel, disabling the first detonator from being addressed by the control unit, using the first detonator to enable a second detonator to be addressed by the control unit, exchanging data between the second detonator and the control unit using the communications bus, using the second detonator to enable a third detonator to be addressed by the control unit, and using the communications bus to disable the second detonator from being addressed by the control unit.

Preferably the first detonator is disabled by means of a first signal sent on the communications bus and, when the first detonator is disabled, the first detonator is used to enable the second detonator to be addressed by the control unit.

The invention also provides a blasting system which includes a control unit, a communications bus which is connected to the control unit, a plurality of detonators which are connected in sequence to the communications bus along its length, and a daisy chain connection between the control unit and the detonators, and wherein, within the sequence of detonators, a first detonator makes use of the daisy chain connection to enable a second following detonator so that data can be exchanged between the control unit and the second detonator using the communications bus.

Preferably the first detonator is disabled by the first signal on the communications bus, from being addressed by the control unit and the first detonator then enables the second following detonator to be addressed by the control unit.

Data which is exchanged between each detonator and the control unit can vary according to requirement and, for example, can include programming data such as timing information which relates to the operation or initiation of the detonator, information on the status or an operational aspect of the detonator, testing information relating to the detonator, detonator identity, detonator address or category data, or the like. The data may be usable by the control unit, to control or set up a blasting operation or sequence.

The detonators may be individually addressable i.e. each detonator may have a respective unique address.

BRIEF DESCRIPTION OF THE DRAWING

The invention is further described by way of examples with reference to the accompanying drawing which illustrates a blasting system according to the invention.

DESCRIPTION OF PREFERRED EMBODIMENT

The accompanying drawing illustrates a blasting system 10 according to the invention.

The blasting system includes a control unit 12 to which is connected a communications bus 14 and a daisy chain system 16. The control unit has terminals 18A and 18B to which the lines of the communications bus are connected, and terminals 18C and 18D to which a daisy chain line 24 and a return line 26 are connected.

A plurality of individually programmable electronic delay detonators 30 are included in the system. The detonators are individually designated 30A, 30B, 30C . . . 30N. The number of detonators in the sequence and their specific nature are determined according to requirement. These aspects are not further described for generally they are known in the art. Each detonator has respective terminals A, B, C and D.

Each detonator 30 is connected in parallel to the communications bus 14 via the terminals A and B, and, within the daisy chain system, the detonators are essentially connected in series via the line 24 and the terminals C and D.

The detonator sequence terminates in a device 32 which is connected to the daisy chain line 24 and the return line 26.

In practice each detonator 30 is positioned in a blast hole adjacent the explosive material using techniques which are known in the art. It is also possible to place a plurality of detonators in a single hole. The control unit 12 is used for programming the individual detonators with timing information which ensures that the detonators initiate the respective explosive charges at precisely determined intervals to obtain a desired blasting pattern.

It is possible to program all the detonators substantially simultaneously using global or broadcast commands such as: "Connect all . . . Set Up . . . Reset . . . Calibrate", directed to all the detonators as the lines A and B which are "common" to the detonators.

Alternatively, in order to program each detonator individually, it is necessary to control access to the detonators on a case-by-case basis. To achieve this the detonator may be identified in different ways eg. by means of its physical position on the bus 14, say number 38 in an ordered sequence of 84 detonators, or the detonator may include respective unique identity or address data, stored in memory in the detonator, which enables the detonator to be individually and directly addressed.

Initially the output 18D on the control unit and the terminals D on the respective detonators are in an inactive or default state and no detonator will respond to information on the communications bus 14. The control unit 12 is used to activate the terminal 18D and a signal is sent to terminal C on the detonator 30A to enable the detonator. The control unit 12 thereafter sends a "connect daisy" command on the communications bus 14 and, as the detonator 30A has been enabled, the detonator responds to the connect daisy command and is thereby connected, for communication purposes, to the control unit via the communications bus 14. The remaining detonators in the sequence, during this process, are not enabled and hence remain inactive.

The detonator 30A can then be programmed directly from the control unit. The identity or position of the detonator 30A is recorded by the control unit and relevant timing information, which has previously been determined, is transferred from the control unit to the detonator 30A to program the detonator according to requirement.

After the transaction between the control unit and the detonator 30A has been completed the control unit instructs the detonator 30A, via the communications bus, to activate its terminal D. When this happens an enabling signal is transmitted by the detonator 30A to the terminal C on the detonator 30B. The controller 12 then sends a disconnect command along the communications bus and the detonator 30A is disconnected from the bus. Thereafter the controller sends a connect daisy command on the communications bus which is received by the detonator 30B and, in a process similar to what has been described, the detonator 30B can then be programmed according to requirement.

The aforementioned process is repeated along the detonator chain with each detonator enabling a following detonator in the sequence so that the following detonator can be programmed by the control unit. As noted once a detonator has been programmed and after it has enabled a following detonator it is effectively disabled by a signal from the control unit sent via the communications bus.

Once the last detonator 30N in the sequence has been programmed a signal output from its terminal D is received by the termination device 32 and is returned via the return line 26 to the control unit. This allows the control unit to determine that the sequence of transactions has reached the end of the installation.

The blasting system of the invention allows the identity or position of each detonator to be recorded in the control unit and for a predetermined time delay to be assigned to each of the detonators. "Identity", in this respect, is to be interpreted broadly and covers the situations in which detonators are distinguishable from one another by means of unique identifiers of any suitable type associated with the respective detonators, and wherein detonators are "identified" by other means eg. the respective positions at which the detonators are connected to the bus 14. If required, and depending on the installation conditions, the time delay between successive detonators in the sequence can be automatically implemented. Once the programming sequence has been initiated it is carried out without human intervention and this reduces the likelihood of human error occurring.

The aforegoing description relates to a specific example. As used herein the word "programming" is to be interpreted broadly for it relates, in general terms, to the exchange of data of any desired kind between the individual detonators and the control unit. Such data could for example relate to test or status information of a detonator, the type or category of a detonator, or any other information which relates to a detonator or its use. The word "programming" is also intended to cover the process of loading time delays into detonators and other activities such as testing, scanning, validating of connections, connect and reset functions, and the like.

When a detonator enables a following detonator this can be in response to separate signals from the control unit to disable the detonator and to enable the following detonator, or in response to a single or "compound" signal which simultaneously conveys both commands i.e. to disable the detonator and to enable the following detonator.

The programming technique which has been described hereinbefore can be varied in that after the transaction between the control unit and the detonator 30A has been completed the control unit sends a signal on the communications bus to disable the detonator 30A i.e. to disconnect from the bus 14. When this happens the detonator 30A automatically transmits an enabling signal to the terminal C on the detonator 30B. Thereafter the controller sends a connect daisy command on the communications bus which is received by the detonator 30B and, in a process similar to what has been described, the detonator 30B can then be programmed according to requirement.

The enabling signal which goes from one detonator to a following detonator may be of a monostable nature and preferably comprises a single burst of information which is coded in the time domain for security and reliability reasons. This is advantageous for it results in more security on the daisy chain. This is due to the fact that the coded information cannot easily be simulated by stray factors eg. leakage of voltage or current from a capacitor, an event which can readily affect a stable state or logic level used in place of the coded information approach to control the enablement of a following detonator.

The aforementioned process is repeated along the detonator chain with each detonator, when it is disconnected from the bus 14, automatically enabling a following detonator in the sequence so that the following detonator can be programmed by the control unit. The "following" detonator could be a physically successive detonator in a given sequence, or a detonator identified as "following" by using a counting or numerical sequence established by associating with each detonator a unique identifier (eg. unique data) which allows the detonator to be distinguished from other detonators, and which provides a means whereby the detonators can be ordered in a sequence which is not necessarily the same as the physical sequence in which the detonators are connected to the bus 14.

Once the last detonator 30N in the sequence has been programmed a signal output from its terminal D is received by the termination device 32 and is returned via the return line 26 to the control unit. This allows the control unit to determine that the sequence of transactions has reached the end of the installation.

In this form of the blasting system of the invention the consecutive detonators are connected to the control unit in the sequence in which they are physically connected to the harness. The direct and automatic enabling of a following detonator by a preceding detonator saves time in the overall communications protocol, and reduces the possibility of environmental interference and the likelihood of human and equipment error.

In the preceding description the detonator which is physically closest to the control unit 12 is treated as the first detonator. The daisy chain programming sequence can however be commenced using any identifiable detonator in the detonator series as the "first" detonator. For example if a chosen detonator can be directly addressed by virtue of its known position in a detonator series or because it includes unique address or identity data then the programming sequence can be started at that detonator and continued in the described manner to the terminal device 32 which then prompts the control unit to connect the last detonator 30N to the physically first detonator 30A. The process then proceeds up to the detonator which is immediately before the detonator at which the programming process was started.

The invention claimed is:

1. A method of programming a plurality of detonators which are connected to a control unit by a communications bus, and there is a daisy chain connection between the control unit and the detonators, the method including the steps of using the control unit to address a first detonator to allow an exchange of data, on the communications bus, between the first detonator and the control unit and using the first detonator to enable a second detonator to be addressed by the control unit to allow an exchange of data, on the communications bus, between the second detonator and the control unit, wherein the second detonator is addressable by the control unit only after an enabling signal has been sent by the first detonator to the second detonator and wherein the enabling signal is sent only after a disabling signal has been sent by the control unit to the first detonator.

2. A method according to claim 1 wherein the second detonator is used to enable a third detonator to be addressed by the control unit to allow an exchange of data, on the communications bus, between the third detonator and the control unit.

3. A method according to claim 1 wherein the first detonator is addressable by the control unit only after a first enabling signal has been sent by the control unit to the first detonator.

4. A method according to claim 1 wherein the first detonator is closest on the communications bus to the control unit.

5. A method according to claim 1 wherein the first detonator is a predetermined one of the plurality of detonators and is directly addressable by the control unit.

6. A method of programming a plurality of detonators in sequence which includes the steps of exchanging data between a first detonator and a control unit using a communications bus to which all of the detonators are connected in parallel, and there is a daisy chain connection between the control unit and the detonators, disabling the first detonator from being addressed by the control unit, using the first detonator to enable a second detonator to be addressed by the control unit, exchanging data between the second detonator and the control unit using the communications bus, using the second detonator to enable a third detonator to be addressed by the control unit, and using the communications bus to disable the second detonator from being addressed by the control unit.

7. A method according to claim 6 wherein the first detonator is disabled by means of a first signal sent on the communications bus and, when the first detonator is disabled, the first detonator is used to enable the second detonator to be addressed by the control unit.

8. A method according to claim 6 wherein the first detonator is a predetermined one of the plurality of detonators and is directly addressable by the control unit.

9. A method according to claim 6 or 7 wherein the first detonator is closest on the communications bus to the control unit.

10. A blasting system which includes a control unit, a communications bus which is connected to the control unit, a plurality of detonators which are individually addressable and which are connected in sequence to the communications bus along its length, and a daisy chain connection between the control unit and the detonators, and wherein, within the sequence of detonators, a first detonator makes use of the daisy chain connection to enable a second following detonator so that data can be exchanged between the control unit and the second detonator using the communications bus.

11. A blasting system according to claim 10 wherein the first detonator is disabled by a first signal on the communications bus, from being addressed by the control unit, and the first detonator then enables the second following detonator to be addressed by the control unit.

12. A blasting system according to claim 10 wherein data which is exchanged between each detonator and the control unit is selected from timing information which relates to the operation or initiation of the detonator; information on the status or an operation aspect of the detonator; testing information relating to the detonator; and detonator identity, address or category data.

13. A blasting system according to claim 10 wherein the first detonator is a predetermined one of the plurality of detonators and is directly addressable by the control unit.

14. A blasting system according to claim 10 wherein the first detonator is closest on the communications bus to the control unit.

* * * * *